US012811880B2

(12) United States Patent
Miklós et al.

(10) Patent No.: US 12,811,880 B2
(45) Date of Patent: Nov. 24, 2026

(54) DETERMINISTIC NETWORK ENTITY FOR COMMUNICATIONS NETWORKS

(71) Applicant: Telefonaktiebolaget LM Ericsson (PUBL), Stockholm (SE)

(72) Inventors: György Miklós, Pilisborosjenö (HU); János Farkas, Kecskemét (HU); Balázs Varga, Budapest (HU)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 410 days.

(21) Appl. No.: 18/559,105

(22) PCT Filed: May 3, 2022

(86) PCT No.: PCT/EP2022/061877
§ 371 (c)(1),
(2) Date: Nov. 6, 2023

(87) PCT Pub. No.: WO2022/233890
PCT Pub. Date: Nov. 10, 2022

(65) Prior Publication Data
US 2024/0235996 A1 Jul. 11, 2024

Related U.S. Application Data

(60) Provisional application No. 63/185,072, filed on May 6, 2021.

(51) Int. Cl.
*H04L 45/02* (2022.01)
*H04L 45/655* (2022.01)
*H04L 45/76* (2022.01)

(52) U.S. Cl.
CPC ............ *H04L 45/655* (2022.05); *H04L 45/02* (2013.01); *H04L 45/76* (2022.05)

(58) Field of Classification Search
CPC . H04L 41/0668; H04L 45/76; H04L 12/4633; H04L 41/0806; H04L 45/655; H04L 45/02
(Continued)

(56) References Cited

U.S. PATENT DOCUMENTS 6,785,277 B1 * 8/2004 Sundling ................ H04L 45/22 370/392
7,286,479 B2 * 10/2007 Bragg .................. H04L 45/033 370/225
(Continued)

FOREIGN PATENT DOCUMENTS

WO WO2021014180 A1 1/2021
WO WO-2023279818 A1 * 1/2023 ............ H04L 45/04

OTHER PUBLICATIONS

Letter of Reasons for Refusal issued for Japanese Patent Application No. 2023-568066—Dec. 13, 2024 [machine translation attached B. Varga, Ed., "RFC 8938; Deterministic Networking (DetNet) Data Plane Framework", Stream: Internet Engineering Task Force (IETF); Published: Nov. 2020; ISSN: 2070-1721. ].
(Continued)

*Primary Examiner* — Anthony Mejia
(74) *Attorney, Agent, or Firm* — Baker Botts L.L.P.

(57) ABSTRACT

A method performed by a network node of a communications network for enabling internet protocol, IP, based deterministic networking. The method comprises receiving a routing request from a software-defined networking (SDN) controller, particularly wherein the SDN controller is associated with a deterministic network (DetNet); determining whether the routing request conflicts with the routing of the communications network; and responsive to determining whether the routing request conflicts with the routing of the communications network, transmitting a response to the SDN controller indicating acceptance or denial of the routing request. The network node may be a Deterministic Networking Application Function (DetNet AF).

17 Claims, 8 Drawing Sheets

(58) Field of Classification Search
USPC .................................................. 370/219, 389
See application file for complete search history.

(56) References Cited

U.S. PATENT DOCUMENTS

| | | | | |
|---|---|---|---|---|
| 10,218,602 | B2 * | 2/2019 | Levy-Abegnoli ....... | H04L 45/16 |
| 10,798,012 | B2 * | 10/2020 | Thubert ................ | H04L 45/121 |
| 2016/0308793 | A1 | 10/2016 | Levy-Abegnoli et al. | |
| 2020/0351969 | A1 | 11/2020 | Miklós et al. | |
| 2020/0374741 | A1 | 11/2020 | Li et al. | |
| 2024/0364624 | A1 * | 10/2024 | Garcia-Luna-Aceves .................. | H04L 45/02 |

OTHER PUBLICATIONS

B. Varga, "RFC 9016; Flow and Service Information Model for Deterministic Networking (DetNet)"; Stream: Internet Engineering Task Force (IETF); Published: Mar. 2021; ISSN: 2070-1721.
3GPP TS 23.501 V17.0.0 (Mar. 2021); 3rd Generation Partnership Project; Technical Specification Group Services and System Aspects; System architecture for the 5G System (5GS); Stage 2 (Release 17).
Jonathan Prados-Garzon et al., "Learnet: Reinforcement Learning Based Flow Scheduling for Asynchronous Deterministic Networks", IEEE 2020.
PCT International Search Report issued for International application No. PCT/EP2022/061877—Aug. 3, 2022.
PCT Written Opinion of the International Searching Authority issued for International application No. PCT/EP2022/061877—Aug. 3, 2022.

* cited by examiner

DETERMINISTIC NETWORK ENTITY FOR COMMUNICATIONS NETWORKS

PRIORITY

This nonprovisional application is a U.S. National Stage Filing under 35 U.S.C. § 371 of International Patent Application Serial No. PCT/EP2022/061877 filed May 3, 2022 and entitled "DETERMINISTIC NETWORK ENTITY FOR COMMUNICATIONS NETWORKS" which claims priority to U.S. Provisional Patent Application No. 63/185,072 filed May 6, 2021, both of which are hereby incorporated by reference in their entirety.

TECHNICAL FIELD

The present invention generally relates to networking in communications networks or mobile networks, and more specifically, the invention relates to internet protocol (IP) based deterministic networking in communications networks or mobile networks.

BACKGROUND

FIG. 1 illustrates an example of a new radio ("NR") network (e.g., a 5th Generation ("5G") network) including a 5G core ("5GC") network 130, network node 120 (e.g., a 5G base station ("gNB")), multiple communication devices 110 (also referred to as user equipment ("UE")).

FIG. 2 illustrates an example of a reference architecture of a 5GC network 130 as defined by the 3rd generation partnership project ("3GPP"). In this example, the 5GC network includes a unified data repository ("UDR") 232, a network exposure function ("NEF") 234, a network data analytics function ("NWDAF") 236, an application function ("AF") 238, a policy charging function ("PCF") 242, a charging function ("CHF") 244, an access and mobility management function ("AMF") 246, and a session management function ("SMF") 248 all communicatively coupled to each other. The 5GC network further includes a user plane function ("UPF") 250 communicatively coupled to the SMF 248.

The PCF 242 supports a unified policy framework to govern the network behavior. Specifically, the PCF 242 provides policy and charging control ("PCC") rules to the policy and charging enforcement function ("PCEF") (e.g., the SMF/UPF that enforces policy and charging decisions according to provisioned PCC rules).

The AMF 246 manages UE access (e.g., when UE is connected through different access networks) and UE mobility aspects.

The SMF 248 supports different functionalities (e.g., SMF 248 receives PCC rules from the PCF 242 and configures the UPF 250 accordingly).

The UPF 250 supports handling of user plane traffic based on the rules received from the SMF 248 (e.g., packet inspection and different enforcement actions such as quality of service ("QoS") handling).

The 3$^{rd}$ generation partnership project ("3GPP") network is increasingly used for critical applications for which low delay and high reliability are important. For Ethernet based use cases, 3GPP release 16 has defined ways to integrate the 3GPP network into a TSN network (see sections 5.27 and 5.28 in 3GPP TS 23.501). In 3GPP release 17, the 3GPP mechanisms for time sensitive communications have been extended for IP based applications as well. The 3GPP release 17 solution includes the AF requested scenarios in which specific applications may request time sensitive service from the 3GPP network.

The internet engineering task force ("IETF") deterministic networking ("DetNet") working group has specified the DetNet architecture (RFC 8655), which provides a capability to carry specified unicast or multicast data flows for real-time applications with extremely low data loss rates and bounded latency within a network domain. The DetNet architecture may be applied over a multiprotocol label switching ("MPLS") data network, or over an internet protocol ("IP") based data network; from the 3GPP network's perspective an IP based data network is in focus. The DetNet data network may be controlled, as a typical example, from a central management entity such as a software-defined networking ("SDN") controller.

There currently exist certain challenge(s). For example, the existing 3GPP release 16 integration into TSN networks is only applicable for Ethernet networks, however, many applications may require IP solutions. The extra cost of adding native Ethernet support may be high or prohibitive.

Furthermore, the existing 3GPP release 17 exposure that can be used for IP applications as well is not aligned with the DetNet framework defined by IETF. In the 3GPP release 17 exposure approach there is no central controller for the IP network domain; the application directly communicates its request to the 3GPP network. As a result, that approach is only applicable for smaller deployments which do not have other IP user plane nodes besides the 3GPP network, or where the other IP user plane nodes besides the 3GPP network are limited in use. In other deployments, there may be additional IP nodes or links besides the 3GPP network, which require a central controller to harmonize and manage the resources in the network domain. Further, the lack of support for DetNet makes the approach difficult to extend and scale, which is a disadvantage for such deployments.

Certain aspects of the disclosure and their embodiments may provide solutions to these or other challenges. In some embodiments, a DetNet application function ("AF") entity is mapping between the IETF based network management interfaces for DetNet and the 3GPP interface. The DetNet AF interfaces the SDN controller of the DetNet network and represents (a part of the) 3GPP network as an IP router. Based on the information received from the SDN controller, the DetNet AF may request QoS reservation for the DetNet flows in the 3GPP network. The DetNet AF may request other configuration updates in the 3GPP network as well. In turn, the DetNet AF has knowledge of the relevant 3GPP network configuration parameters as well (such as for example topology and routing information), and provides the information to the SDN controller, as expected of an IP router. When the DetNet AF receives explicit flow routing configuration from the SDN controller, it may compare it with the current routing in the 3GPP network that it may be aware based on configuration or based on explicit signaling from the SMF or UPF entities.

In additional or alternative embodiments, when the explicit flow routing information is aligned with the current routing in the system, the DetNet AF accepts the request to the SDN controller. When the explicit flow routing information is not aligned with the current routing in the system, the DetNet AF may either reject the request from the SDN controller, or when applicable, it may update the routing within the 3GPP system.

In some examples, a DetNet AF entity which is aware of the 3GPP system's applied routing, either based on configuration or based on explicit signaling information. The Det- Net AF may receive routing requests from an SDN controller, which the DetNet AF accepts if it is aligned with the existing routing. If the routing request from the SDN controller is not aligned with the current routing in the system, the DetNet AF may reject the routing request, or when applicable, it may update the routing within the 3GPP system.

In additional or alternative examples, the DetNet AF may receive topology and routing information from the 3GPP system, including for example the IP addresses that are reachable on a given PDU session or on an N6 interface, or information about the IP neighbor nodes that are reachable over a PDU session or over an N6 interface. The DetNet AF sends the topology information to the SDN controller.

In additional or alternative examples, the SDN controller may send information about the DetNet flows and their QoS requirements to the DetNet AF. The DetNet AF maps this information to QoS requests towards the 3GPP system.

Certain embodiments may provide one or more of the following technical advantage(s). In some embodiments, a DetNet AF entity, which is aware of the 3GPP system's applied routing, either based on configuration or based on explicit signaling information. The DetNet AF may receive routing requests from an SDN controller, which the DetNet AF accepts if it is aligned with the existing routing. If the routing request from the SDN controller is not aligned with the current routing in the system, the DetNet AF may reject the routing request, or when applicable, it may update the routing within the 3GPP system.

In additional or alternative embodiments, the DetNet AF may receive topology and routing information from the 3GPP system, including for example the IP addresses that are reachable on a given PDU session or on an N6 interface, or information about the IP neighbor nodes that are reachable over a PDU session or over an N6 interface. The DetNet AF sends the topology information to the SDN controller.

In additional or alternative embodiments, the SDN controller may send information about the DetNet flows and their QoS requirements to the DetNet AF. The DetNet AF maps this information to QoS requests towards the 3GPP system.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

SUMMARY

Figure 1:
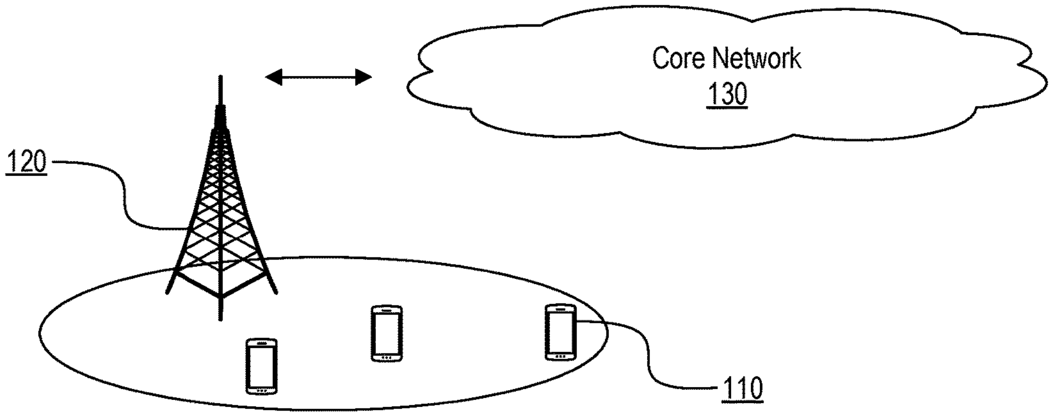
FIG. 1 is a schematic diagram illustrating an example of a $5^{th}$ generation ("5G") network.
Figure 2:
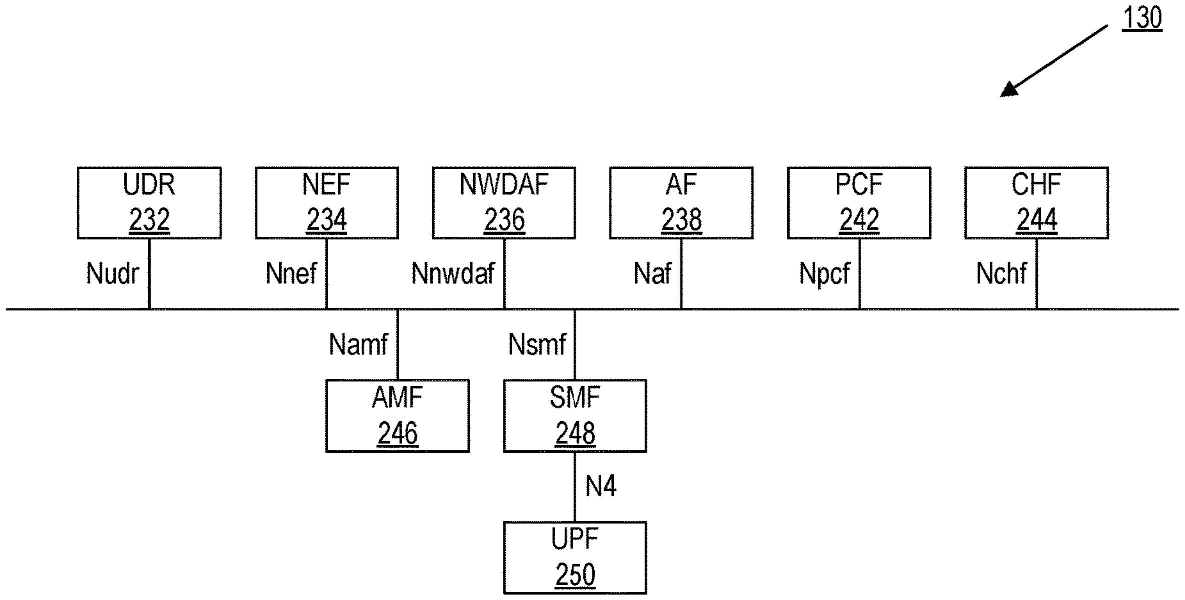
FIG. 2 is a block diagram illustrating an example of a 5G network architecture.

An object of the invention is to enable internet protocol (IP) based deterministic networking in communications networks or mobile networks.

A first aspect of the invention relates to a method performed by a network node of a communications network for enabling internet protocol, IP, based deterministic networking. The method comprises receiving a routing request from a software-defined networking (SDN) controller, particularly wherein the SDN controller is associated with a deterministic network (DetNet); determining whether the routing request conflicts with the routing of the communications network; and responsive to determining whether the routing request conflicts with the routing of the communications network, transmitting a response to the SDN controller indicating acceptance or denial of the routing request.

In some embodiments, the communications network comprises a 5th generation, 5G, network.

In some embodiments, the network node is a DetNet application function.

In some embodiments, the network node comprises a core network (CN) node configured to provide the DetNet application function.

In some embodiments, the method further comprises determining control and configuration information of the communications network, the control and configuration information including information about the routing of the communications network.

In some embodiments, determining control and configuration information comprises receiving control and configuration information from at least one of a user plane function (UPF); a session management function (SMF), an access and mobility management function (AMF); and a policy control function (PCF).

In some embodiments, the control and configuration information comprises topology and routing information including IP addresses assigned over packet data unit (PDU) sessions in the communications network.

In some embodiments, determining the control and configuration information of the communications network comprises determining multicast delivery rules associated with the communications network including at least one of information associated with supported multicast addresses; flows for which multicast delivery is configured; and a set of outgoing interfaces.

In some embodiments, determining whether the routing request conflicts with the routing of the communications network comprises determining whether the routing request complies with the multicast delivery rules.

In some embodiments, determining whether the routing request conflicts with the routing of the communications network comprises determining whether the routing request would route packets with a given destination address to another packet data unit (PDU) session compared to a destination IP address to PDU session mapping.

In some embodiments, determining whether the routing request conflicts with the routing of the communications network comprises determining that the routing request is in conflict with the routing of the communications network, and wherein transmitting the response to the SDN controller comprises transmitting a denial of the routing request.

In some embodiments, determining whether the routing request conflicts with the routing of the communications network comprises determining that the routing request does not conflict with the routing of the communications network, and wherein transmitting the response to the SDN controller comprises transmitting an acceptance of the routing request.

In some embodiments, determining whether the routing request conflicts with the routing of the communications network comprises determining that the routing request is in conflict with the routing of the communications network.

In some embodiments, the method further comprises updating the routing of the communication network to avoid the routing request from conflicting with the routing of the communication network.

In some embodiments, transmitting the response to the SDN controller comprises, responsive to updating the routing of the communication network, transmitting an acceptance of the routing request.

In some embodiments, updating the routing of the communication network comprises converting configuration information associated with the routing request to configuration information applicable to the communications network; and transmitting the configuration information applicable to the communications network to at least one of a user plane function (UPF); a session management function (SMF), an access and mobility management function (AMF); and a policy control function (PCF) of the communications network.

In some embodiments, the method further comprises receiving a request to establish a DetNet flow associated with the routing request in the communications network from the SDN controller, the request to establish the DetNet flow including quality of service (QOS) requirements for the DetNet flow; determining whether the communications network is capable of meeting the QoS requirements; and responsive to determining that the communication network is capable of meeting the QoS requirements, establishing the DetNet flow.

In some embodiments, determining whether the communications network is capable of meeting the QoS requirements comprises converting the QoS requirements for the DetNet flow to 3rd generation partnership project, 3GPP, specific QoS requirements; and transmitting the 3GPP specific QoS requirements to a policy control function, PCF of the communications network.

In some embodiments, the method further comprises receiving a request to establish a deterministic network (DetNet) flow in the communications network from a software-defined network, SDN, controller, the request to establish the DetNet flow including quality of service (QOS) requirements for the DetNet flow; determining whether the communications network is capable of meeting the QoS requirements; and responsive to determining that the communication network is capable of meeting the QoS requirements, establishing the DetNet flow.

In some embodiments, the network node is a Deterministic Networking Application Function (DetNet AF).

A second aspect of the invention relates to a method performed by a network node of a communications network for enabling internet protocol, IP, based deterministic networking. The method comprises receiving a request to establish a deterministic network, DetNet, flow in the communications network from a software-defined network, SDN, controller, the request to establish the DetNet flow including quality of service, QoS, requirements for the DetNet flow; determining whether the communications network is capable of meeting the QoS requirements; and responsive to determining that the communication network is capable of meeting the QoS requirements, establishing the DetNet flow.

Other aspects of the invention relate to mobile network nodes configured to perform the respective methods as described herein. Other aspects of the invention relate to computer program and computer program products.

Objectives, features and advantages of the concepts disclosed herein will be apparent from the following description, claims and drawings, or may be learned by practice of the described technologies and concepts as set forth herein.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

DETAILED DESCRIPTION

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Deterministic Networking (DetNet) operates at the IP and Multiprotocol Label Switching (MPLS) layers and provides time-sensitive features that guarantee almost zero packet loss rates and bounded latency. DetNet is targeted for networks that are under a single administrative control or within a closed group of administrative control, so it is not intended for large groups of domains such as the Internet.

DetNet can be applicable to many use cases in Industrial Automation verticals, for industrial machine-to-machine communication, smart grid. DetNet is able to provide deterministic QoS when UDP/IP is the transport selected for deterministic field-level communication.

The 5GS is being placed within a DetNet IP data plane network. DetNet support in 3GPP can be achieved by reusing the TSC framework for deterministic QoS and time synchronization services.

A DetNet AF is defined to provide mapping between the central DetNet controller entity and the 5G system. Mapping involves translation of DetNet traffic profile and flow specification to 5GS QoS parameters and TSCAI. DetNet AF handles the DetNet YANG groups, its processing and mapping reusing the TSC framework.

Existing 3GPP routing mechanisms can be re-used for DetNet; It is assumed the typical 3GPP scenario with IP end-hosts behind the UEs.

Figure 3:
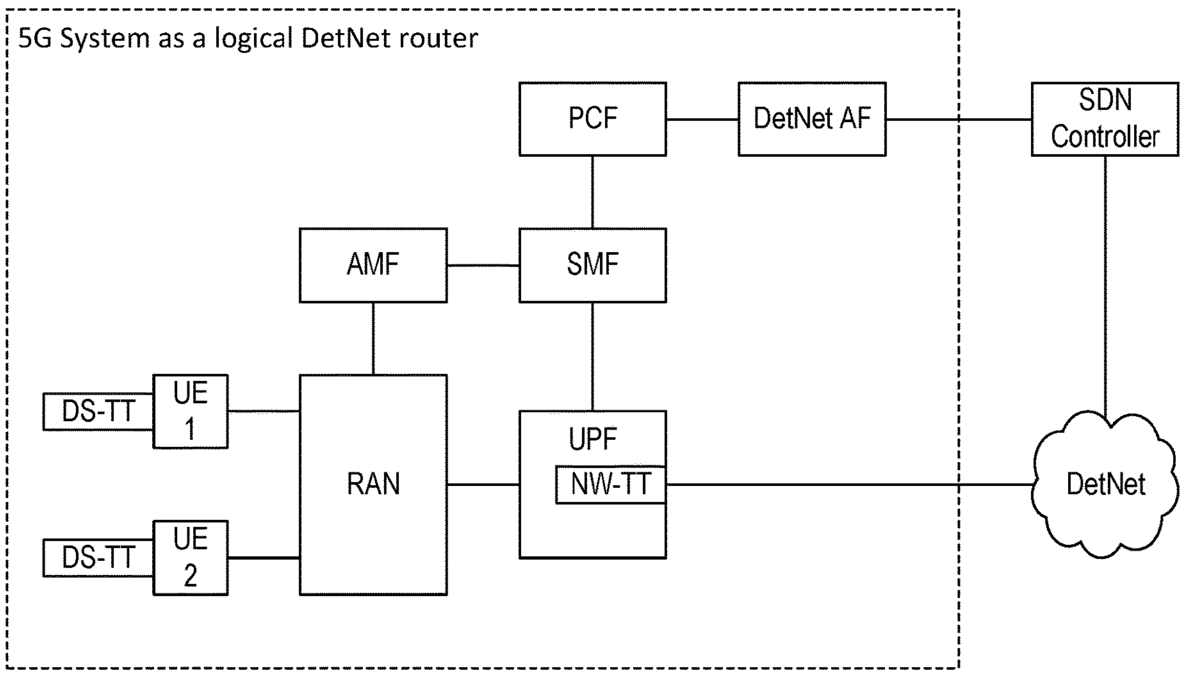
FIG. 3 is a block diagram illustrating an example of a 5G system being used as a logical DetNet router according to some embodiments of inventive concepts.

FIG. 3 illustrates an example of a system overview. The 3GPP system includes a RAN and a UPF entity in the user plane, UEs (e.g., communication devices), and an AMF, a SMF, and a PCF as part of the system architecture defined in 3GPP TS 23.501. DetNet flows within the DetNet domain are being controlled by an SDN controller. The 5G system appears as a DetNet IP router towards the SDN controller (this may be on a per UPF granularity for each network).

The DetNet AF is a logical entity in the 3GPP system which represents the 5G system as a logical IP router towards the SDN controller. The DetNet AF collects the necessary control and configuration information from the 5G system. The DetNet AF receives configuration from the SDN controller, which may take place e.g., over a Netconf interface between the SDN Controller and the DetNet AF, using YANG modelling. The DetNet AF may convert the configuration information to 3GPP domain and request the needed configuration/control updates in the 3GPP network. The DetNet AF responds to the requests from the SDN controller, and the DetNet AF provides the necessary information to the SDN controller so that it has a full view of the DetNet network and can set up the DetNet flows with the necessary QoS requirements.

In some examples, there may also be a NEF entity between the PCF and the DetNet AF, especially in case where the DetNet AF is not considered trusted. The NEF may relay the information.

In some embodiments, the DetNet AF may collect information about the 3GPP network's topology and routing. This may be based on configuration, for example, the DetNet AF may be pre-configured with the IP addresses assigned over the PDU Sessions in a given network, and also the neighbors of the UPF over the N6 interface (or other interfaces). There may be one or more IP addresses assigned for a given PDU Session. Alternatively, the network topology and routing information may be collected by the DetNet AF using control signaling. This may be using the PMIC and BMIC mechanisms and the information elements contained by them, or additional information elements or other signaling mechanisms. The UPF or SMF may provide information about the IP addresses assigned to the UEs over the individual PDU Sessions. There may be a single IP address (single IPv4 and/or single IPv6 address) assigned for a given PDU Session, or multiple addresses in case of prefix delegation or framed routing support. This information can be based on the existing IP address assignment mechanisms, since the IP addresses are assigned by the SMF or UPF. The UPF or SMF may also provide information about the neighbors that are reachable over the N6 interface, when available. This information may be based on a neighbor discovery protocol run over that interface, or a protocol which may provide neighbor information such as IGP. In case there are multiple N6 interfaces, this information may be provided separately for each interface. When other interfaces are present (such as N19), the neighbor information may be provided for those interfaces as well. Besides the neighbor information, the SMF or UPF may provide information about the IP address assigned to an interface (such as an N6 interface), or other interface identifier (e.g., port number) as well. The information may be sent from the UPF via the SMF, PCF to the DetNet AF within the BMIC or PMIC information, or using other signaling mechanism. Note that the information may be provided from the NW-TT. As an alternative, the IP address information may also be provided from the device side (UE), and it may arrive from the DS-TT as well. The UPF may also assign a port number or other interface identifier corresponding to the PDU Sessions and N6 or other interfaces, however the assignment of such port numbers is optional and may not be used in all embodiments.

The SDN controller may provide explicit flow routes to the DetNet routers. Hence, the SDN controller may also provide such explicit flow routes to the DetNet AF. These flow routes may set the flow specification using filters (a 6-tuple of combination of header fields) and for the given traffic it specifies which outgoing interface to route the traffic to. This helps the SDN controller assign a path to DetNet flows such that the QoS requirements can be met.

In a 3GPP domain, the routing however is typically determined in the UPF, and does not need to be changed for the flows individually. This is due to the typical deployments where there are endhosts behind the UEs, rather than routers. Therefore, in typical deployments the routing does not have to be updated.

In some embodiments, the DetNet AF may verify based on the topology information that it has (based on configuration, or based on explicit signaling from the SMFs or UPFs via the PCF) and the existing routing (based on the mapping of the IP addresses of the UEs to the PDU Sessions) fulfils the requirements of the explicit routing from the SDN controller. In case the explicit routing request from the SDN controller is aligned with the routing and topology information in the 3GPP system, i.e., the SDN controller does not request to route traffic that is known to be different from how the 3GPP system routes the packets, the DetNet AF may accept the SDN controller's explicit routing request without taking further action, i.e., without any routing update in the 3GPP system. The DetNet AF may store the explicit route provided by the SDN controller, including the flow specification and the outgoing interface, as that information may be useful in determining the PDU Session associated with a given flow. In case the SDN controller requests to route traffic that is known to be different from how the 3GPP system routes the packets, the DetNet AF can deny the SDN controller's request.

Figure 4:
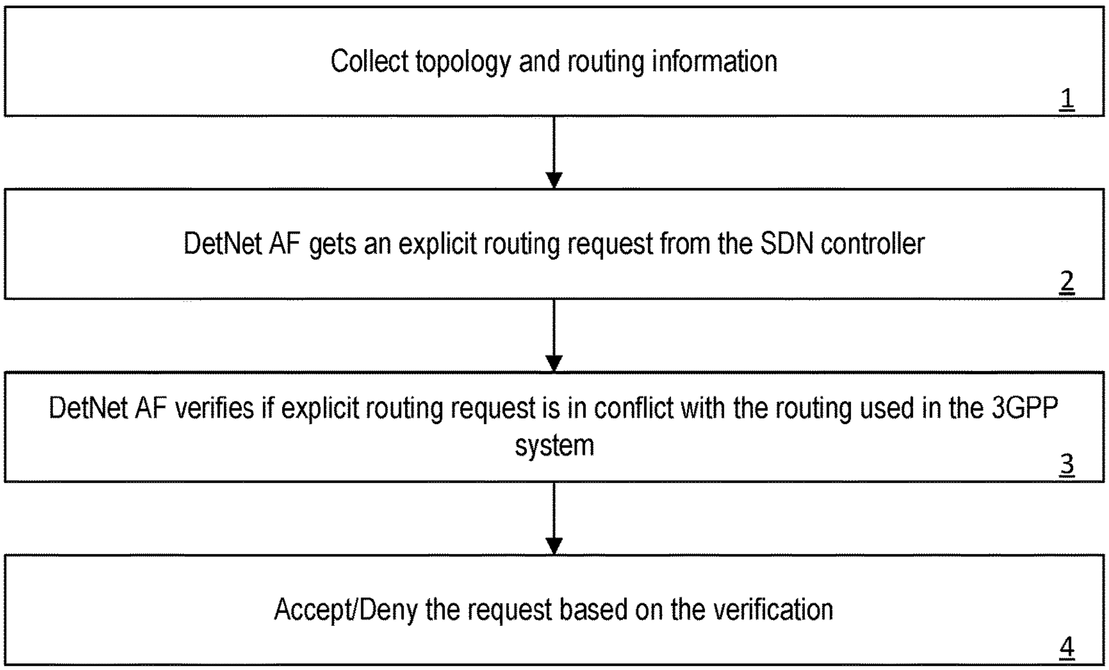
FIG. 4 is a flow chart illustrating an example of operations for operating the 5G system of FIG. 3 as a logical router according to some embodiments of inventive concepts.

FIG. 4 illustrates an example of operations performed by the DetNet AF to cause the 5G system to appear as a logical router to the SDN controller. At block 1, the DetNet AF collects information about the 3GPP system's topology and routing information. At block 2, the DetNet AF gets an explicit routing request from the SDN controller. At block 3, the DetNet AF verifies whether the explicit routing request from the SDN controller is in conflict with the 3GPP systems topology and routing information. Specifically, the DetNet AF verifies whether the explicit routing request from the SDN controller would route packets with a given destination address to another PDU Session compared to the destination IP address to PDU Session mapping known in the 3GPP system. At block 4, if the DetNet AF's explicit routing request is in conflict with the 3GPP system's routing, then the DetNet AF denies the SDN controller's routing request, otherwise the DetNet AF accepts the SDN controller's request without necessarily updating the routing in the 3GPP system. The DetNet AF may store the explicit route provided by the SDN controller, including the flow specification and the outgoing interface, as that information may be useful in determining the PDU Session associated with a given flow.

The operations in FIG. 4 are based on the assumption that there are only endhosts behind the UEs and no routers by which there would be connectivity between UEs outside the 3GPP system. Therefore, there is just a single route towards the UEs, hence the UPF has no choice and can only select a single PDU session when it needs to select the route towards an IP host behind a UE. In more complex topologies where the assumption is not met, this simple procedure would not be sufficient, but in the 3GPP deployments, the assumption about the simple topology is typically fulfilled.

In some examples, at block 4, it is not excluded that the DetNet AF may update the routing in the 3GPP system when such update possibility is possible. For that purpose, the explicit routing request may e.g., be forwarded to the SMF (one of the SMFs for the concerned PDU Session, or an SMF designated for the update of the routing in the given network), so that the SMF may update the PDR and FAR rules within the UPF to update the routing. Alternatively, the explicit routing request may be forwarded directly to the UPF which may update its internal routing table accordingly. As yet another alternative, the explicit routing information may be forwarded to a router that is external to the UPF which may update the routing accordingly, and the UPF observes the routing based on a header field as indicated by the external router. However, all of these options are not required for this invention. This invention proposes that the DetNet AF can determine on its own, based on the 3GPP network's topology and routing information, whether the explicit routing request complies with the 3GPP routing rules, and accepts or denies the SDN controller's request based on that determination.

The above description focuses on unicast cases. However, it is possible to apply the innovation to multicast as follows.

In some embodiments, the UPF may be configured to provide multicast support. For certain multicast addresses or for a set of given flows specified by filter criteria, the UPF may replicate traffic towards a set of outgoing interfaces. This may be set by a priori configuration or set by multicast protocols. The UPF or SMF may provide information about the supported multicast addresses or the flows for which multicast delivery is configured, and the set of outgoing interfaces. This information may be provided e.g., in a BMIC or similar information that is sent from the UPF to the DetNet AF.

In some examples in which the SDN controller sets explicit routing for multicast, the DetNet AF can similarly check whether the SDN controller's request complies with the multicast delivery rules configured in the UPF. If the request complies with the multicast routing in the UPF, the DetNet AF can accept the request, otherwise it can deny the request. (Alternatively, when the system capability is present, it is not excluded that the DetNet AF requests the SMF or UPF to update the multicast routing as required.)

In some embodiments, the SDN controller may provide DetNet flow-related parameters. This may include IP Flow Identification and Specification, Traffic Specification and QoS requirements. The DetNet AF may use these parameters to request QoS for the DetNet flow from the 3GPP system. The DetNet AF may forward some or all of these parameters to the 3GPP systems PCF in order to set up the QoS flows in the 3GPP system. Alternatively, the DetNet AF may map some or all of these parameters to other QoS parameter based on a per-configured mapping table in the DetNet AF, or using an algorithmic mapping, and use other parameters to request QoS from the 3GPP system.

In additional or alternative embodiments, the DetNet AF needs to determine the input and output ports of a given DetNet flow in the DetNet AF. This is needed in order to determine which PDU Session is carrying the given DetNet flow, so that the DetNet AF can request QoS for the given PDU Session (or more precisely, for the AF session between the PCF and the DetNet AF that corresponds to the given PDU Session). Further, the DetNet AF also needs to determine whether the given DetNet flow is downlink or uplink, so that it can also provide the flow direction (downlink/uplink) to the 3GPP system. It is also possible to have UE to UE DetNet flows, which have an uplink and a downlink leg with corresponding PDU Sessions. (In the case of multicast, there are multiple downlink legs.)

In some examples, the outgoing port and the corresponding PDU Session in the downlink direction can be identified based on the routing information that the DetNet AF has collected from the 3GPP system or from the SDN controller explicit flow routing information or from configuration, as described above. For this purpose, it is advantageous that the SDN Controller also specifies the destination IP address as part of the DetNet IP Flow Identification and Specification. The destination IP address can be mapped based on the IP address that has been assigned for the given PDU Session. Alternatively, if the SDN controller has provided explicit flow routing information to the DetNet AF which it has accepted, that information is also suitable for determining the PDU Session in the downlink direction. For this purpose, the DetNet AF stores the explicit routing information. This includes the flow specification as well as the outgoing port. Based on the outgoing port, the PDU Session is given. Otherwise if SDN controller this information, the other flow specification attributes could be mapped using a pre-configured table in the DetNet AF to the appropriate port/PDU Session.

In the uplink direction, the incoming port and the corresponding PDU Session in the uplink direction can be identified based on the routing information that the DetNet AF has collected from the 3GPP system or from configuration, as described above. For this purpose, it is advantageous that the SDN Controller also specifies the source IP address as part of the DetNet IP Flow Identification and Specification. The source IP address can be mapped based on the IP address that has been assigned for the given PDU Session. If the source IP address is not specified for the DetNet flow by the SDN controller, the other flow specification attributes could be mapped using a pre-configured table in the DetNet AF to the appropriate port/PDU Session.

In some examples, for DetNet flows that span from one UE to another UE, the incoming and outgoing ports/PDU Sessions can be determined in case the SDN controller specifies both the source and destination IP addresses. Otherwise the determination can be based on other attributes and a mapping table that is pre-configured in the DetNet AF, or the downlink PDU Session can be determined based on the explicit route's outgoing port as mentioned earlier.

In some embodiments, it is advantageous if the SDN controller specifies both the source and destination IP addresses for the DetNet flows which makes the determination of the corresponding PDU Session easier in case a 3GPP network is integrated into the system.

In some embodiments, the PDU Sessions at the DetNet AF may be identified. In some examples, the PDU sessions at the DetNet AF may be identified by the IP address assigned to the PDU Session. In case there are multiple IP addresses assigned, it is possible to pick one of them for identification. It is possible to flag the IP address that is used for identification. The IP address may be provided to the DetNet AF from the UPF (or NW-TT entity residing within the UPF), or from the SMF, or from the UE (or DS-TT entity residing within the device on the UE side). In additional or alternative examples, the PDU sessions at the DetNet AF may be identified by a port number which is assigned by the UPF. In additional or alternative examples, the PDU sessions at the DetNet AF may be identified by another identifier, such as an identifier of the N4 session corresponding to the PDU Session, or a locally assigned or configured interface identifier, or an identifier assigned by the DetNet AF and communicated to the SMF and UPF.

In additional or alternative embodiments, the interface identifier (such as the port number or other interface identifier) may also be provided from the DetNet AF to the SDN controller, so that the SDN controller could later refer to that interface identifier when specifying the outgoing interface(s) for explicit routes.

Figure 5:
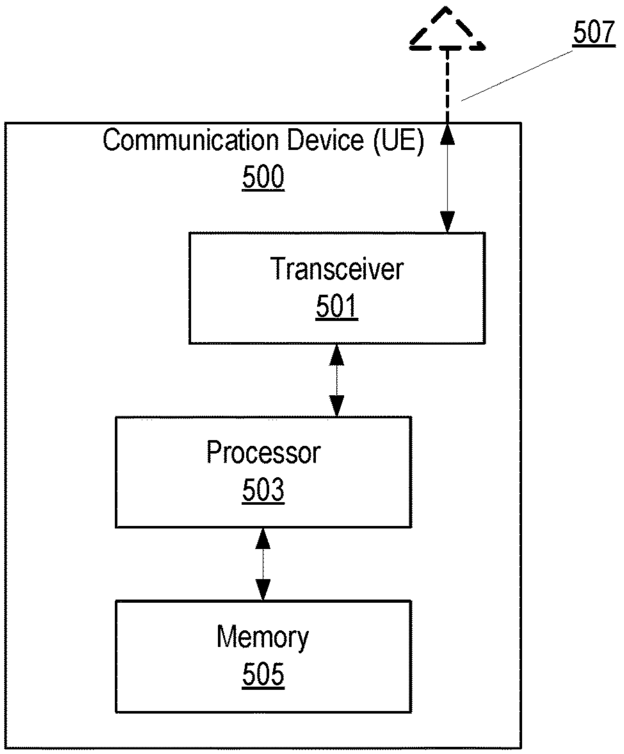
FIG. 5 is a block diagram illustrating a communication device according to some embodiments of inventive concepts.

FIG. 5 is a block diagram illustrating elements of a communication device 500 (also referred to as a mobile terminal, a mobile communication terminal, a wireless device, a wireless communication device, a wireless terminal, mobile device, a wireless communication terminal, user equipment ("UE") a user equipment node/terminal/device, etc.) configured to provide wireless communication according to embodiments of inventive concepts. (Communication device 500 may be provided, for example, as discussed below with respect to wireless devices UE 9012A, UE 9012B, and wired or wireless devices UE 9012C, UE 9012D of FIG. 9, UE 1000 of FIG. 10, virtualization hardware 1304 and virtual machines 1308A, 1308B of FIG. 13, and UE 1406 of FIG. 14, all of which should be considered interchangeable in the examples and embodiments described herein and be within the intended scope of this disclosure, unless otherwise noted.) As shown, communication device 500 may include an antenna 507 (e.g., corresponding to antenna 1022 of FIG. 10), and transceiver circuitry 501 (also referred to as a transceiver, e.g., corresponding to interface 1012 of FIG. 10 having transmitter 1018 and receiver 1020) including a transmitter and a receiver configured to provide uplink and downlink radio communications with a base station(s) (e.g., corresponding to network node 9010A, 9010B of FIG. 9, network node 1100 of FIG. 11, and network node 1404 of FIG. 14 also referred to as a RAN node) of a radio access network. communication device 500 may also include processing circuitry 503 (also referred to as a processor, e.g., corresponding to processing circuitry 1002 of FIG. 10, and control system 1312 of FIG. 13) coupled to the transceiver circuitry, and memory circuitry 505 (also referred to as memory, e.g., corresponding to memory 1010 of FIG. 9) coupled to the processing circuitry 503. The memory circuitry 505 may include computer readable program code that when executed by the processing circuitry 503 causes the processing circuitry 503 to perform operations according to embodiments disclosed herein. According to other embodiments, processing circuitry 503 may be defined to include memory so that separate memory circuitry is not required. Communication device 500 may also include an interface (such as a user interface) coupled with processing circuitry 503, and/or communication device 500 may be incorporated in a vehicle.

As discussed herein, operations of communication device 500 may be performed by processing circuitry 503 and/or transceiver circuitry 501. For example, processing circuitry 503 may control transceiver circuitry 501 to transmit communications through transceiver circuitry 501 over a radio interface to a radio access network node (also referred to as a base station) and/or to receive communications through transceiver circuitry 501 from a RAN node over a radio interface. Moreover, modules may be stored in memory circuitry 505, and these modules may provide instructions so that when instructions of a module are executed by processing circuitry 503, processing circuitry 503 performs respective operations (e.g., operations discussed below with respect to Example Embodiments relating to wireless communication devices). According to some embodiments, a communication device 500 and/or an element(s)/function(s) thereof may be embodied as a virtual node/nodes and/or a virtual machine/machines.

Figure 6:
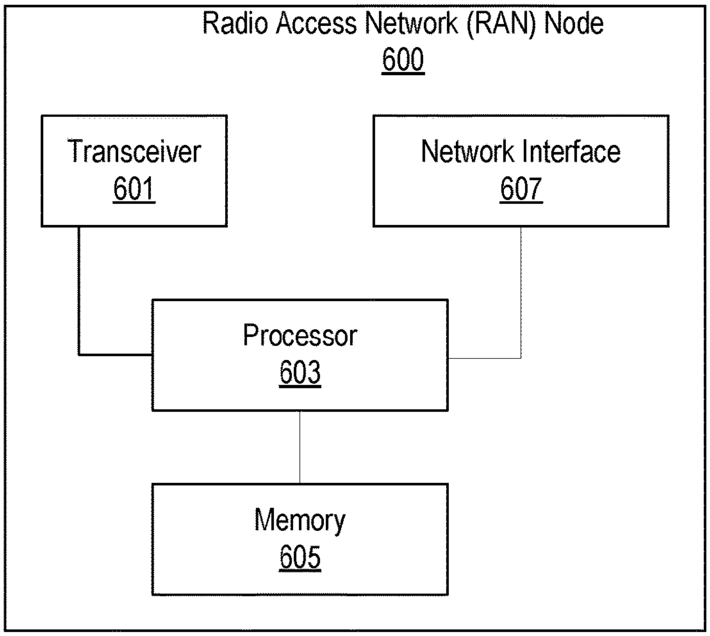
FIG. 6 is a block diagram illustrating a radio access network RAN node (e.g., a base station eNB/gNB) according to some embodiments of inventive concepts.

FIG. 6 is a block diagram illustrating elements of a radio access network ("RAN") node 600 (also referred to as a network node, base station, eNodeB/eNB, gNodeB/gNB, etc.) of a RAN configured to provide cellular communication according to embodiments of inventive concepts. (RAN node 600 may be provided, for example, as discussed below with respect to network node 9010A, 9010B of FIG. 9, network node 1100 of FIG. 11, hardware 1304 or virtual machine 1308A, 1308B of FIG. 13, and/or base station 1404 of FIG. 14, all of which should be considered interchangeable in the examples and embodiments described herein and be within the intended scope of this disclosure, unless otherwise noted.) As shown, the RAN node 600 may include transceiver circuitry 601 (also referred to as a transceiver, e.g., corresponding to portions of RF transceiver circuitry 1112 and radio front end circuitry 1118 of FIG. 11) including a transmitter and a receiver configured to provide uplink and downlink radio communications with mobile terminals. The RAN node 600 may include network interface circuitry 607 (also referred to as a network interface, e.g., corresponding to portions of communication interface 1106 of FIG. 11) configured to provide communications with other nodes (e.g., with other base stations) of the RAN and/or core network ("CN"). The network node 600 may also include processing circuitry 603 (also referred to as a processor, e.g., corresponding to processing circuitry 1102 of FIG. 11) coupled to the transceiver circuitry 601, and memory circuitry 605 (also referred to as memory, e.g., corresponding to memory 1104 of FIG. 11) coupled to the processing circuitry. The memory circuitry 605 may include computer readable program code that when executed by the processing circuitry 603 causes the processing circuitry 603 to perform operations according to embodiments disclosed herein. According to other embodiments, processing circuitry 603 may be defined to include memory so that a separate memory circuitry 605 is not required.

As discussed herein, operations of the RAN node 600 may be performed by processing circuitry 603, network interface 607, and/or transceiver 601. For example, processing circuitry 603 may control transceiver 601 to transmit downlink communications through transceiver 601 over a radio interface to one or more mobile terminals UEs and/or to receive uplink communications through transceiver 601 from one or more mobile terminals UEs over a radio interface. Similarly, processing circuitry 603 may control network interface 607 to transmit communications through network interface 607 to one or more other network nodes and/or to receive communications through network interface from one or more other network nodes. Moreover, modules may be stored in memory 605, and these modules may provide instructions so that when instructions of a module are executed by processing circuitry 603, processing circuitry 603 performs respective operations (e.g., operations discussed below with respect to Example Embodiments relating to RAN nodes). According to some embodiments, RAN node 600 and/or an element(s)/function(s) thereof may be embodied as a virtual node/nodes and/or a virtual machine/machines.

According to some other embodiments, a network node may be implemented as a core network ("CN") node without a transceiver. In such embodiments, transmission to a wireless communication device UE may be initiated by the CN node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 7:
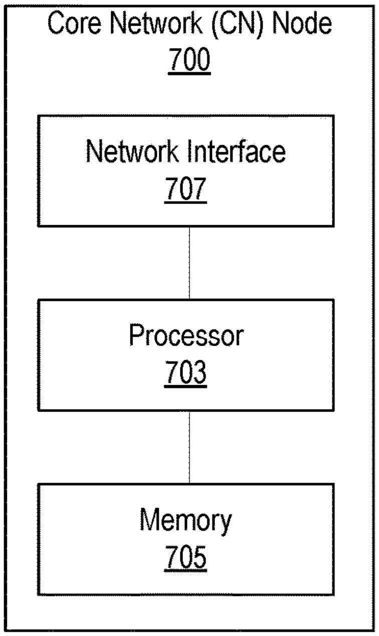
FIG. 7 is a block diagram illustrating a core network CN node (e.g., an AMF node, an SMF node, etc.) according to some embodiments of inventive concepts.

FIG. 7 is a block diagram illustrating elements of a CN node (e.g., an SMF (session management function) node, an AMF (access and mobility management function) node, etc.) of a communication network configured to provide cellular communication according to embodiments of inventive concepts. (CN node 700 may be provided, for example, as discussed below with respect to core network node 9008 of FIG. 9, hardware 1304 or virtual machine 1308A, 1308B of FIG. 13, all of which should be considered interchangeable in the examples and embodiments described herein and be within the intended scope of this disclosure, unless otherwise noted) As shown, the CN node 700 may include network interface circuitry 707 configured to provide communications with other nodes of the core network and/or the radio access network RAN. The CN node 700 may also include a processing circuitry 703 (also referred to as a processor,) coupled to the network interface circuitry, and memory circuitry 705 (also referred to as memory) coupled to the processing circuitry. The memory circuitry 705 may include computer readable program code that when executed by the processing circuitry 703 causes the processing circuitry 703 to perform operations according to embodiments disclosed herein. According to other embodiments, processing circuitry 703 may be defined to include memory so that a separate memory circuitry is not required.

As discussed herein, operations of the CN node 700 may be performed by processing circuitry 703 and/or network interface circuitry 707. For example, processing circuitry 703 may control network interface circuitry 707 to transmit communications through network interface circuitry 707 to one or more other network nodes and/or to receive communications through network interface circuitry from one or more other network nodes. Moreover, modules may be stored in memory 705, and these modules may provide instructions so that when instructions of a module are executed by processing circuitry 703, processing circuitry 703 performs respective operations (e.g., operations discussed below with respect to Example Embodiments relating to core network nodes). According to some embodiments, CN node 700 and/or an element(s)/function(s) thereof may be embodied as a virtual node/nodes and/or a virtual machine/machines.

In the description that follows, while the network node may be any of the core network node 700, core network node 9008, hardware 1304, or virtual machine 1308A, 1308B, the core network node 700 shall be used to describe the functionality of the operations of the network node. Operations of the Core Network CN node 700 (implemented using the structure of FIG. 7) will now be discussed with reference to the flow chart of FIG. 8 according to some embodiments of inventive concepts. For example, modules may be stored in memory 705 of FIG. 7, and these modules may provide instructions so that when the instructions of a module are executed by respective CN node processing circuitry 703, processing circuitry 703 performs respective operations of the flow chart.

Figure 8:
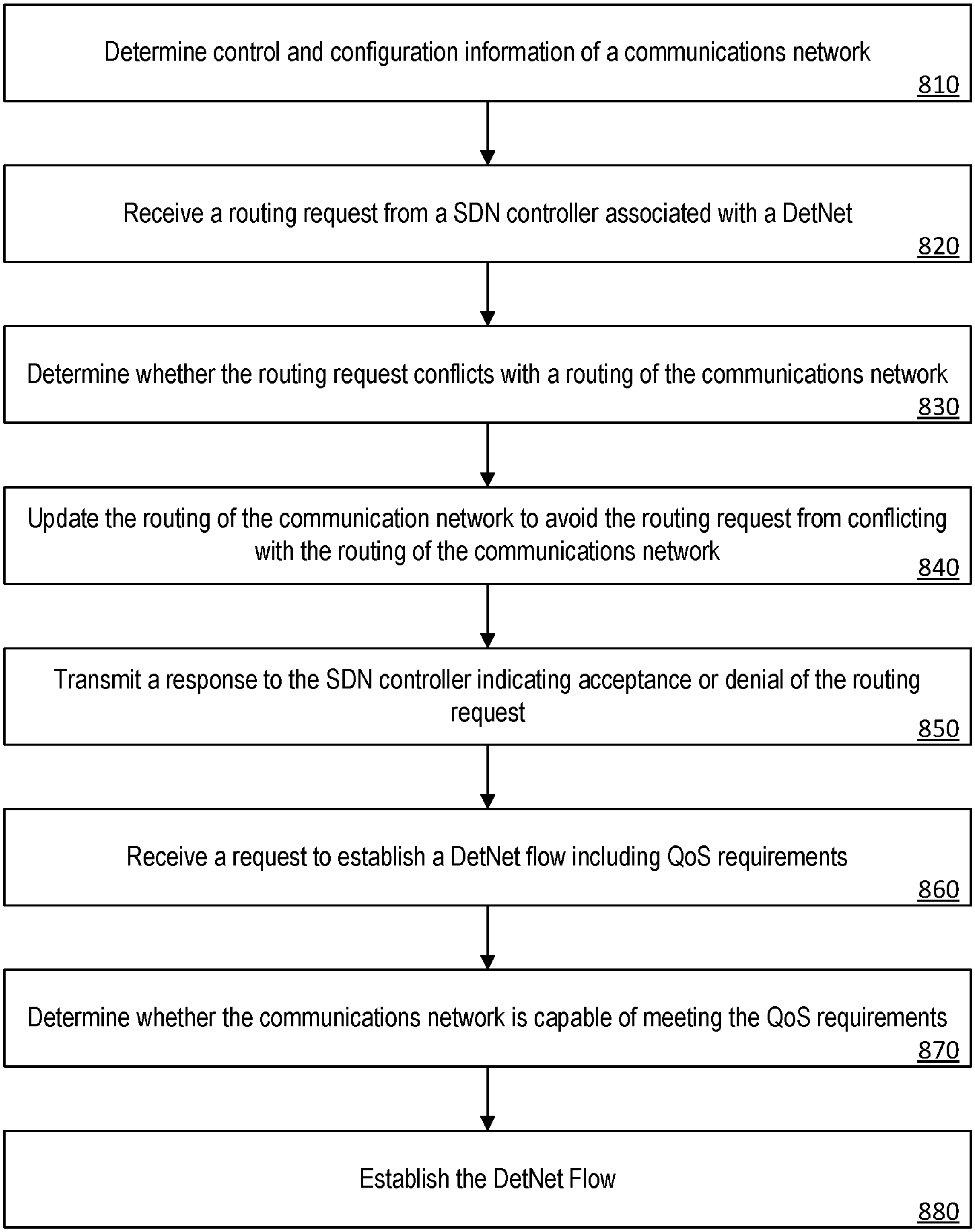
FIG. 8 is a flow chart illustrating operations of a CN node configured to provide a DetNet AF according to some embodiments of inventive concepts.

FIG. 8 is a flow chart illustrating an example of operations performed by a network node of a communications network for enabling internet protocol, IP, based deterministic networking ("DetNet"). In some embodiments, the communications network includes a 5th generation ("5G") network and the network node includes a core network ("CN") node configured to provide a DetNet application function.

At block 810, processing circuitry 703 determines control and configuration information of a communications network. In some embodiments, the control and configuration information includes information about a routing of the communications network. In some embodiments, determining the control and configuration information of the communications network includes receiving control and configuration information from at least one of a user plane function, UPF; a session management function, SMF, an access and mobility management function, AMF; and a policy control function, PCF.

In additional or alternative embodiments, the control and configuration information includes topology and routing information including IP addresses assigned over packet data unit, PDU, sessions in the communications network.

In additional or alternative embodiments, determining the control and configuration information of the communications network includes determining multicast delivery rules associated with the communications network including at least one of information associated with supported multicast addresses; flows for which multicast delivery is configured; and a set of outgoing interfaces.

At block 820, processing circuitry 703 receives, via network interface 707, a routing request from a SDN controller associated with a DetNet.

At block 830, processing circuitry 703 determines whether the routing request conflicts with a routing of the communications network. In some embodiments, determining whether the routing request conflicts with the routing of the communications network includes determining whether the routing request complies with the multicast delivery rules. In additional or alternative embodiments, determining whether the routing request conflicts with the routing of the communications network includes determining whether the routing request would route packets with a given destination address to another packet data unit, PDU, session compared to a destination IP address to PDU session mapping.

At block 840, processing circuitry 703 updates the routing of the communications network to avoid the routing request from conflicting with the routing of the communications network. In some embodiments, updating the routing of the communication network includes converting configuration information associated with the routing request to configuration information applicable to the communications network; and transmitting the configuration information applicable to the communications network to at least one of a user plane function, UPF; a session management function, SMF, an access and mobility management function, AMF; and a policy control function, PCF of the communications network.

At block 850, processing circuitry 703 transmits, via network interface 707, a response to the SDN controller indicating acceptance or denial of the routing request. In some embodiments, determining whether the routing request conflicts with the routing of the communications network includes determining that the routing request is in conflict with the routing of the communications network, and transmitting the response to the SDN controller includes transmitting a denial of the routing request.

In other embodiments, determining whether the routing request conflicts with the routing of the communications network includes determining that the routing request does not conflict with the routing of the communications network, and transmitting the response to the SDN controller includes transmitting an acceptance of the routing request.

In additional or alternative embodiments, determining whether the routing request conflicts with the routing of the communications network includes determining that the routing request is in conflict with the routing of the communications network, and responsive to updating the routing of the communication network, transmitting an acceptance of the routing request.

At block 860, processing circuitry 703 receives, via network interface 707, a request to establish a DetNet flow associated with the routing request in the communications network from the SDN controller. The request to establish the DetNet flow can include QoS requirements for the DetNet flow.

At block 870, processing circuitry 703 determines whether the communications network is capable of meeting the QoS requirements. In some embodiments, determining whether the communications network is capable of meeting the QoS requirements includes converting the QoS requirements for the DetNet flow to $3^{rd}$ generation partnership project, 3GPP, specific QoS requirements; and transmitting the 3GPP specific QoS requirements to a policy control function, PCF of the communications network.

At block 880, processing circuitry 703 establishes the DetNet flow.

Various operations from the flow chart of FIG. 8 may be optional with respect to some embodiments of CN nodes and related methods. Regarding methods of example embodiment 1 (set forth below), for example, operations of blocks 840, 860, 870, and 880 of FIG. 8 may be optional.

Figure 9:
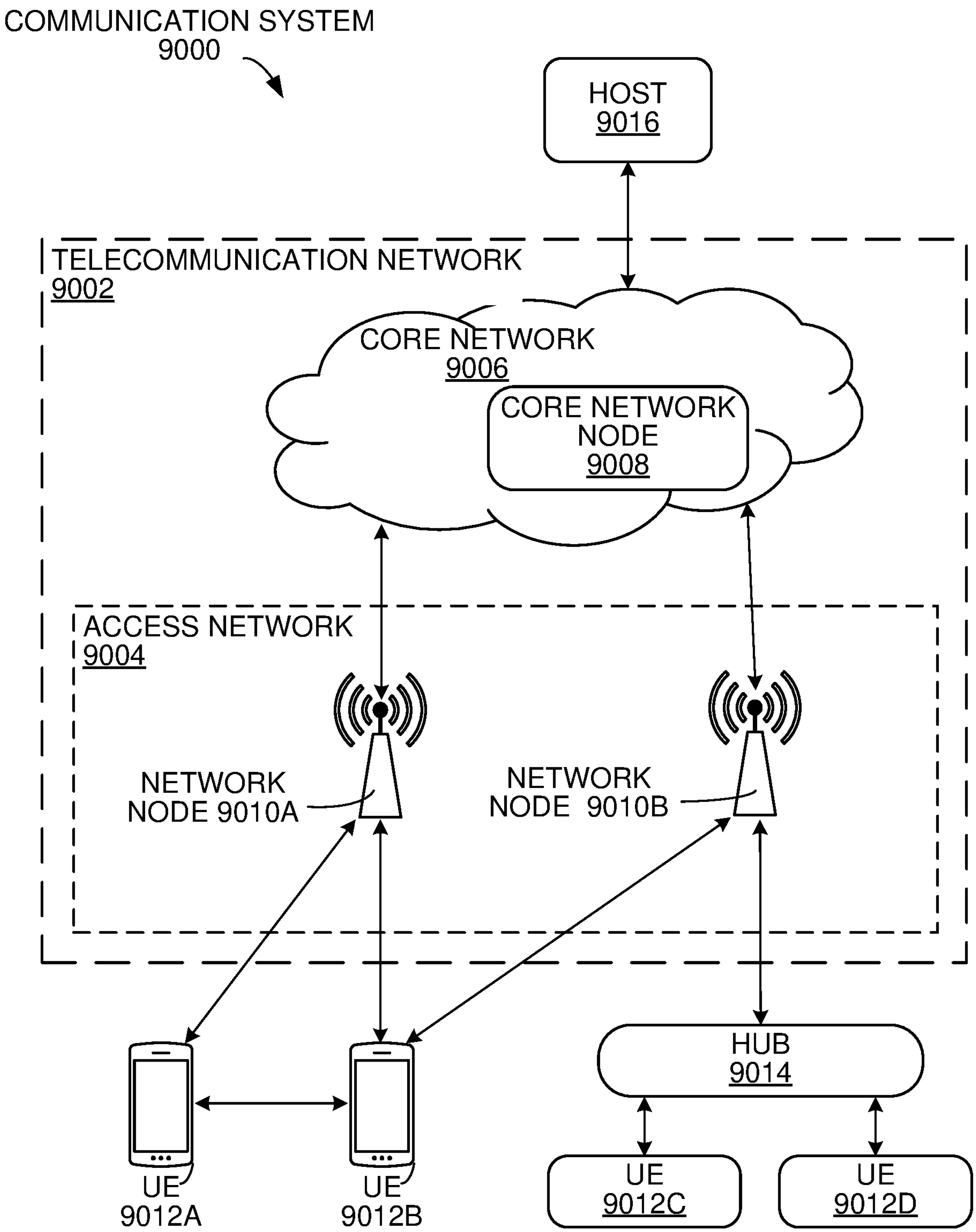
FIG. 9 is a block diagram of a communication system in accordance with some embodiments.

FIG. 9 shows an example of a communication system 9000 in accordance with some embodiments.

In the example, the communication system 9000 includes a telecommunication network 9002 that includes an access network 9004, such as a radio access network (RAN), and a core network 9006, which includes one or more core network nodes 9008. The access network 9004 includes one or more access network nodes, such as network nodes 9010*a* and 9010*b* (one or more of which may be generally referred to as network nodes 9010), or any other similar $3^{rd}$ Generation Partnership Project (3GPP) access node or non-3GPP access point. The network nodes 9010 facilitate direct or indirect connection of user equipment (UE), such as by connecting UEs 9012*a*, 9012*b*, 9012*c*, and 9012*d* (one or more of which may be generally referred to as UEs 9012) to the core network 9006 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 9000 may include any number of wired or wireless networks, network nodes, UEs, and/or any other components or systems that may facilitate or participate in the communication of data and/or signals whether via wired or wireless connections. The communication system 9000 may include and/or interface with any type of communication, telecommunication, data, cellular, radio network, and/or other similar type of system.

The UEs 9012 may be any of a wide variety of communication devices, including wireless devices arranged, configured, and/or operable to communicate wirelessly with the network nodes 9010 and other communication devices. Similarly, the network nodes 9010 are arranged, capable, configured, and/or operable to communicate directly or indirectly with the UEs 9012 and/or with other network nodes or equipment in the telecommunication network 9002 to enable and/or provide network access, such as wireless network access, and/or to perform other functions, such as administration in the telecommunication network 9002.

In the depicted example, the core network 9006 connects the network nodes 9010 to one or more hosts, such as host 9016. These connections may be direct or indirect via one or more intermediary networks or devices. In other examples, network nodes may be directly coupled to hosts. The core network 9006 includes one more core network nodes (e.g., core network node 9008) that are structured with hardware and software components. Features of these components may be substantially similar to those described with respect to the UEs, network nodes, and/or hosts, such that the descriptions thereof are generally applicable to the corresponding components of the core network node 9008. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 9016 may be under the ownership or control of a service provider other than an operator or provider of the access network 9004 and/or the telecommunication network 9002, and may be operated by the service provider or on behalf of the service provider. The host 9016 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 9000 of FIG. 9 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 9002 is a cellular network that implements 3GPP standardized features. Accordingly, the telecommunications network 9002 may support network slicing to provide different logical networks to different devices that are connected to the telecommunication network 9002. For example, the telecommunications network 9002 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 9012 are configured to transmit and/or receive information without direct human interaction. For instance, a UE may be designed to transmit information to the access network 9004 on a predetermined schedule, when triggered by an internal or external event, or in response to requests from the access network 9004. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 9014 communicates with the access network 9004 to facilitate indirect communication between one or more UEs (e.g., UE 9012*c* and/or 9012*d*) and network nodes (e.g., network node 9010*b*). In some examples, the hub 9014 may be a controller, router, content source and analytics, or any of the other communication devices described herein regarding UEs. For example, the hub 9014 may be a broadband router enabling access to the core network 9006 for the UEs. As another example, the hub 9014 may be a controller that sends commands or instructions to one or more actuators in the UEs. Commands or instructions may be received from the UEs, network nodes 9010, or by executable code, script, process, or other instructions in the hub 9014. As another example, the hub 9014 may be a data collector that acts as temporary storage for UE data and, in some embodiments, may perform analysis or other processing of the data. As another example, the hub 9014 may be a content source. For example, for a UE that is a VR headset, display, loudspeaker or other media delivery device, the hub 9014 may retrieve VR assets, video, audio, or other media or data related to sensory information via a network node, which the hub 9014 then provides to the UE either directly, after performing local processing, and/or after adding additional local content. In still another example, the hub 9014 acts as a proxy server or orchestrator for the UEs, in particular in if one or more of the UEs are low energy IoT devices.

The hub 9014 may have a constant/persistent or intermittent connection to the network node 9010*b*. The hub 9014 may also allow for a different communication scheme and/or schedule between the hub 9014 and UEs (e.g., UE 9012*c* and/or 9012*d*), and between the hub 9014 and the core network 9006. In other examples, the hub 9014 is connected to the core network 9006 and/or one or more UEs via a wired connection. Moreover, the hub 9014 may be configured to connect to an M2M service provider over the access network 9004 and/or to another UE over a direct connection. In some scenarios, UEs may establish a wireless connection with the network nodes 9010 while still connected via the hub 9014 via a wired or wireless connection. In some embodiments, the hub 9014 may be a dedicated hub—that is, a hub whose primary function is to route communications to/from the UEs from/to the network node 9010*b*. In other embodiments, the hub 9014 may be a non-dedicated hub—that is, a device which is capable of operating to route communications between the UEs and network node 9010*b*, but which is additionally capable of operating as a communication start and/or end point for certain data channels.

Figure 10:
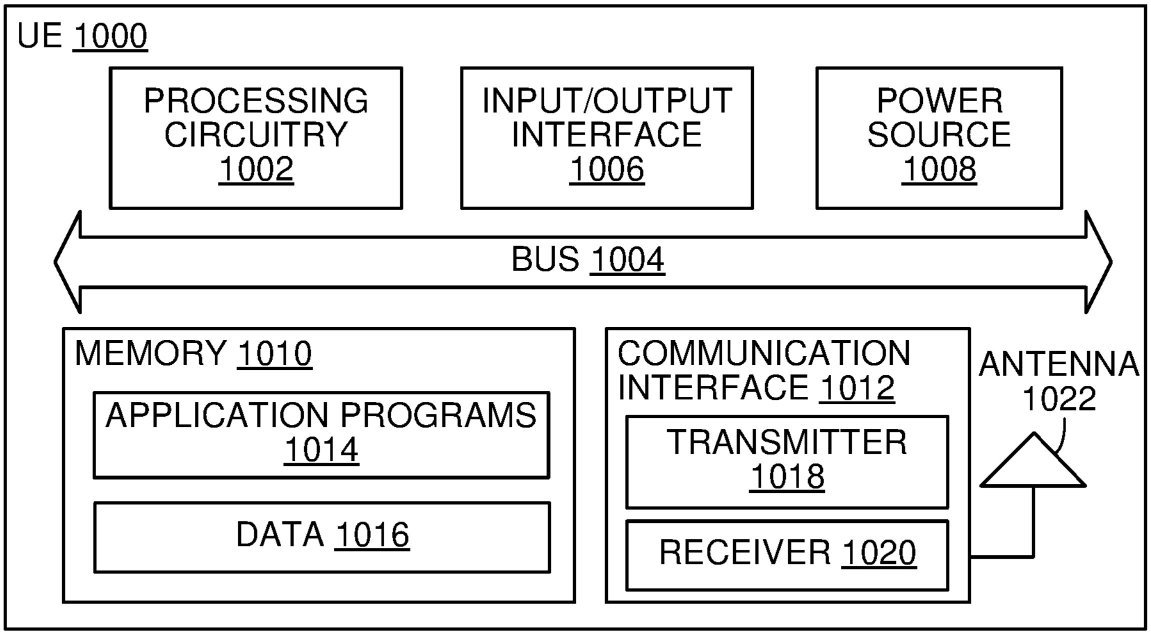
FIG. 10 is a block diagram of a user equipment in accordance with some embodiments

FIG. 10 shows a UE 1000 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IOT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1000 includes processing circuitry 1002 that is operatively coupled via a bus 1004 to an input/output interface 1006, a power source 1008, a memory 1010, a communication interface 1012, and/or any other component, or any combination thereof. Certain UEs may utilize all or a subset of the components shown in FIG. 10. The level of integration between the components may vary from one UE to another UE. Further, certain UEs may contain multiple instances of a component, such as multiple processors, memories, transceivers, transmitters, receivers, etc.

The processing circuitry 1002 is configured to process instructions and data and may be configured to implement any sequential state machine operative to execute instructions stored as machine-readable computer programs in the memory 1010. The processing circuitry 1002 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1002 may include multiple central processing units (CPUs).

In the example, the input/output interface 1006 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1000. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1008 is structured as a battery or battery pack. Other types of power sources, such as an external power source (e.g., an electricity outlet), photovoltaic device, or power cell, may be used. The power source 1008 may further include power circuitry for delivering power from the power source 1008 itself, and/or an external power source, to the various parts of the UE 1000 via input circuitry or an interface such as an electrical power cable. Delivering power may be, for example, for charging of the power source 1008. Power circuitry may perform any formatting, converting, or other modification to the power from the power source 1008 to make the power suitable for the respective components of the UE 1000 to which power is supplied.

The memory 1010 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1010 includes one or more application programs 1014, such as an operating system, web browser application, a widget, gadget engine, or other application, and corresponding data 1016. The memory 1010 may store, for use by the UE 1000, any of a variety of various operating systems or combinations of operating systems.

The memory 1010 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1010 may allow the UE 1000 to access instructions, application programs and the like, stored on transitory or non-transitory memory media, to off-load data, or to upload data. An article of manufacture, such as one utilizing a communication system may be tangibly embodied as or in the memory 1010, which may be or comprise a device-readable storage medium.

The processing circuitry 1002 may be configured to communicate with an access network or other network using the communication interface 1012. The communication interface 1012 may comprise one or more communication subsystems and may include or be communicatively coupled to an antenna 1022. The communication interface 1012 may include one or more transceivers used to communicate, such as by communicating with one or more remote transceivers of another device capable of wireless communication (e.g., another UE or a network node in an access network). Each transceiver may include a transmitter 1018 and/or a receiver 1020 appropriate to provide network communications (e.g., optical, electrical, frequency allocations, and so forth). Moreover, the transmitter 1018 and receiver 1020 may be coupled to one or more antennas (e.g., antenna 1022) and may share circuit components, software or firmware, or alternatively be implemented separately.

In the illustrated embodiment, communication functions of the communication interface 1012 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1012, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IOT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1000 shown in FIG. 10.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IOT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 11:
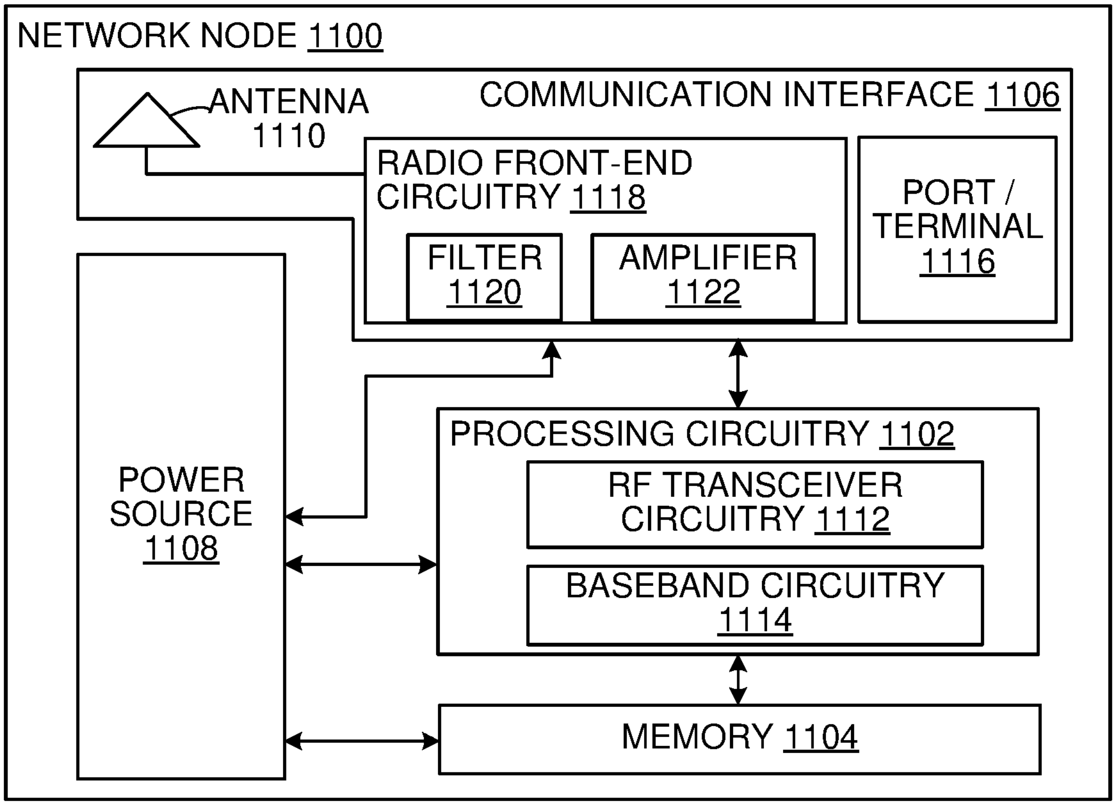
FIG. 11 is a block diagram of a network node in accordance with some embodiments.

FIG. 11 shows a network node 1100 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1100 includes a processing circuitry 1102, a memory 1104, a communication interface 1106, and a power source 1108. The network node 1100 may be composed of multiple physically separate components (e.g., a NodeB component and a RNC component, or a BTS component and a BSC component, etc.), which may each have their own respective components. In certain scenarios in which the network node 1100 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1100 may be configured to support multiple radio access technologies (RATs). In such embodiments, some components may be duplicated (e.g., separate memory 1104 for different RATs) and some components may be reused (e.g., a same antenna 1110 may be shared by different RATs). The network node 1100 may also include multiple sets of the various illustrated components for different wireless technologies integrated into network node 1100, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1100.

The processing circuitry 1102 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1100 components, such as the memory 1104, to provide network node 1100 functionality.

In some embodiments, the processing circuitry 1102 includes a system on a chip (SOC). In some embodiments, the processing circuitry 1102 includes one or more of radio frequency (RF) transceiver circuitry 1112 and baseband processing circuitry 1114. In some embodiments, the radio frequency (RF) transceiver circuitry 1112 and the baseband processing circuitry 1114 may be on separate chips (or sets of chips), boards, or units, such as radio units and digital units. In alternative embodiments, part or all of RF transceiver circuitry 1112 and baseband processing circuitry 1114 may be on the same chip or set of chips, boards, or units.

The memory 1104 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1102. The memory 1104 may store any suitable instructions, data, or information, including a computer program, software, an application including one or more of logic, rules, code, tables, and/or other instructions capable of being executed by the processing circuitry 1102 and utilized by the network node 1100. The memory 1104 may be used to store any calculations made by the processing circuitry 1102 and/or any data received via the communication interface 1106. In some embodiments, the processing circuitry 1102 and memory 1104 is integrated.

The communication interface 1106 is used in wired or wireless communication of signaling and/or data between a network node, access network, and/or UE. As illustrated, the communication interface 1106 comprises port(s)/terminal(s) 1116 to send and receive data, for example to and from a network over a wired connection. The communication interface 1106 also includes radio front-end circuitry 1118 that may be coupled to, or in certain embodiments a part of, the antenna 1110. Radio front-end circuitry 1118 comprises filters 1120 and amplifiers 1122. The radio front-end circuitry 1118 may be connected to an antenna 1110 and processing circuitry 1102. The radio front-end circuitry may be configured to condition signals communicated between antenna 1110 and processing circuitry 1102. The radio front-end circuitry 1118 may receive digital data that is to be sent out to other network nodes or UEs via a wireless connection. The radio front-end circuitry 1118 may convert the digital data into a radio signal having the appropriate channel and bandwidth parameters using a combination of filters 1120 and/or amplifiers 1122. The radio signal may then be transmitted via the antenna 1110. Similarly, when receiving data, the antenna 1110 may collect radio signals which are then converted into digital data by the radio front-end circuitry 1118. The digital data may be passed to the processing circuitry 1102. In other embodiments, the communication interface may comprise different components and/or different combinations of components.

In certain alternative embodiments, the network node 1100 does not include separate radio front-end circuitry 1118, instead, the processing circuitry 1102 includes radio front-end circuitry and is connected to the antenna 1110. Similarly, in some embodiments, all or some of the RF transceiver circuitry 1112 is part of the communication interface 1106. In still other embodiments, the communication interface 1106 includes one or more ports or terminals 1116, the radio front-end circuitry 1118, and the RF transceiver circuitry 1112, as part of a radio unit (not shown), and the communication interface 1106 communicates with the baseband processing circuitry 1114, which is part of a digital unit (not shown).

The antenna 1110 may include one or more antennas, or antenna arrays, configured to send and/or receive wireless signals. The antenna 1110 may be coupled to the radio front-end circuitry 1118 and may be any type of antenna capable of transmitting and receiving data and/or signals wirelessly. In certain embodiments, the antenna 1110 is separate from the network node 1100 and connectable to the network node 1100 through an interface or port.

The antenna 1110, communication interface 1106, and/or the processing circuitry 1102 may be configured to perform any receiving operations and/or certain obtaining operations described herein as being performed by the network node. Any information, data and/or signals may be received from a UE, another network node and/or any other network equipment. Similarly, the antenna 1110, the communication interface 1106, and/or the processing circuitry 1102 may be configured to perform any transmitting operations described herein as being performed by the network node. Any information, data and/or signals may be transmitted to a UE, another network node and/or any other network equipment.

The power source 1108 provides power to the various components of network node 1100 in a form suitable for the respective components (e.g., at a voltage and current level needed for each respective component). The power source 1108 may further comprise, or be coupled to, power management circuitry to supply the components of the network node 1100 with power for performing the functionality described herein. For example, the network node 1100 may be connectable to an external power source (e.g., the power grid, an electricity outlet) via an input circuitry or interface such as an electrical cable, whereby the external power source supplies power to power circuitry of the power source 1108. As a further example, the power source 1108 may comprise a source of power in the form of a battery or battery pack which is connected to, or integrated in, power circuitry. The battery may provide backup power should the external power source fail.

Embodiments of the network node 1100 may include additional components beyond those shown in FIG. 11 for providing certain aspects of the network node's functionality, including any of the functionality described herein and/or any functionality necessary to support the subject matter described herein. For example, the network node 1100 may include user interface equipment to allow input of information into the network node 1100 and to allow output of information from the network node 1100. This may allow a user to perform diagnostic, maintenance, repair, and other administrative functions for the network node 1100.

Figure 12:
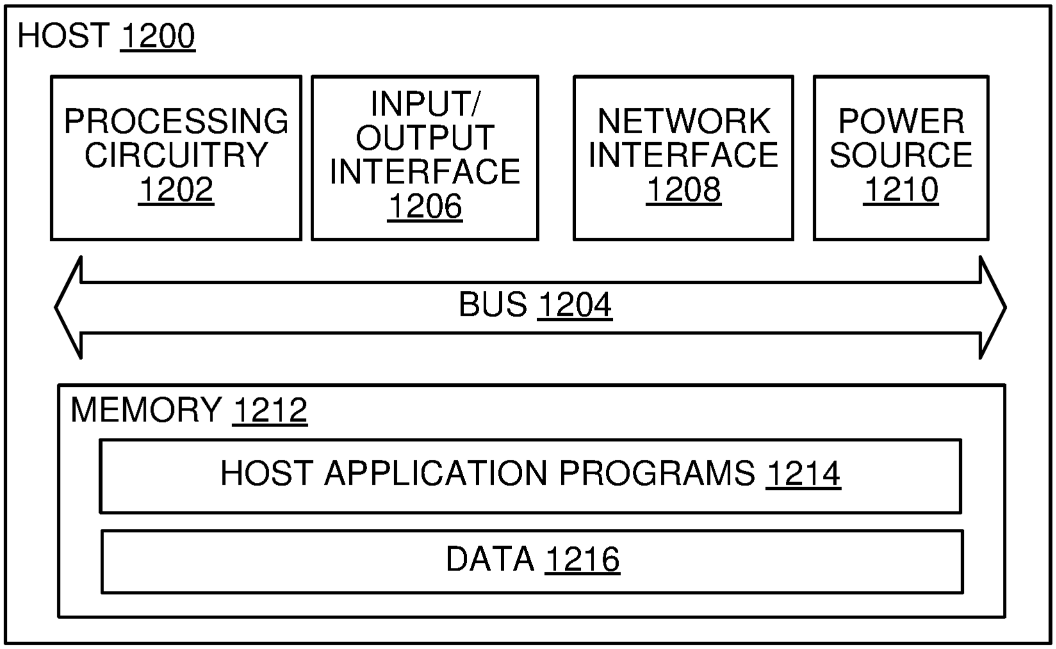
FIG. 12 is a block diagram of a host computer communicating with a user equipment in accordance with some embodiments.

FIG. 12 is a block diagram of a host 1200, which may be an embodiment of the host 9016 of FIG. 9, in accordance with various aspects described herein. As used herein, the host 1200 may be or comprise various combinations hardware and/or software, including a standalone server, a blade server, a cloud-implemented server, a distributed server, a virtual machine, container, or processing resources in a server farm. The host 1200 may provide one or more services to one or more UEs.

The host 1200 includes processing circuitry 1202 that is operatively coupled via a bus 1204 to an input/output interface 1206, a network interface 1208, a power source 1210, and a memory 1212. Other components may be included in other embodiments. Features of these components may be substantially similar to those described with respect to the devices of previous figures, such as FIGS. 10 and 11, such that the descriptions thereof are generally applicable to the corresponding components of host 1200.

The memory 1212 may include one or more computer programs including one or more host application programs 1214 and data 1216, which may include user data, e.g., data generated by a UE for the host 1200 or data generated by the host 1200 for a UE. Embodiments of the host 1200 may utilize only a subset or all of the components shown. The host application programs 1214 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1214 may also provide for user authentication and licensing checks and may periodically report health, routes, and content availability to a central node, such as a device in or on the edge of a core network. Accordingly, the host 1200 may select and/or indicate a different host for over-the-top services for a UE. The host application programs 1214 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 13:
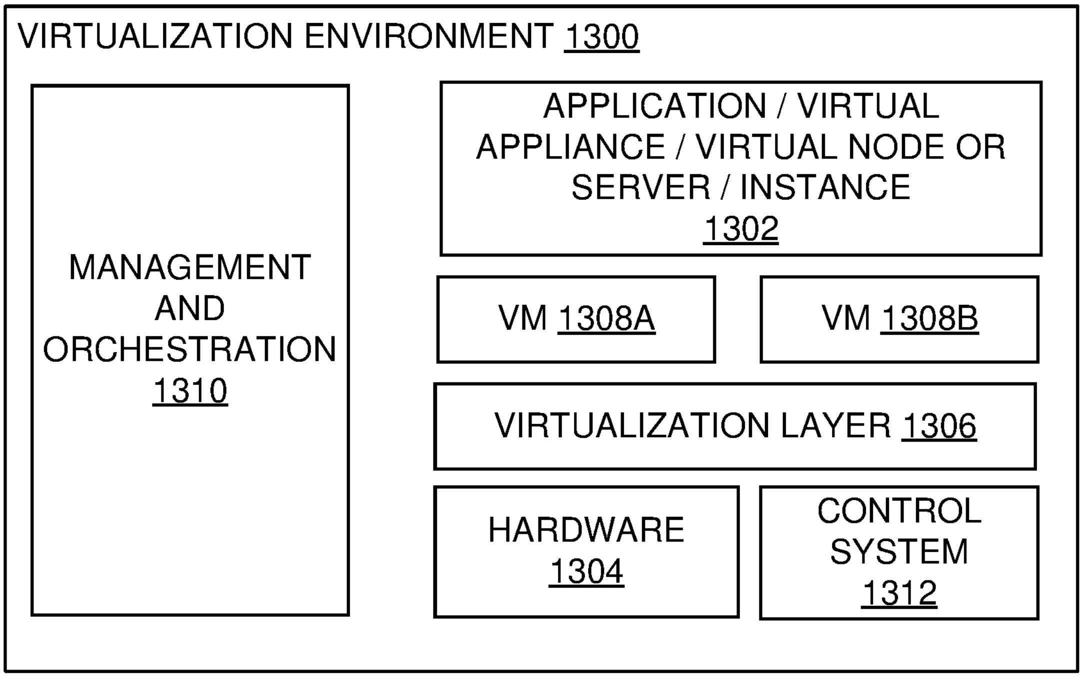
FIG. 13 is a block diagram of a virtualization environment in accordance with some embodiments.

FIG. 13 is a block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1300 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1302 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1304 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1306 (also referred to as hypervisors or virtual machine monitors (VMMs)), provide VMs 1308*a* and 1308*b* (one or more of which may be generally referred to as VMs 1308), and/or perform any of the functions, features and/or benefits described in relation with some embodiments described herein. The virtualization layer 1306 may present a virtual operating platform that appears like networking hardware to the VMs 1308.

The VMs 1308 comprise virtual processing, virtual memory, virtual networking or interface and virtual storage, and may be run by a corresponding virtualization layer 1306. Different embodiments of the instance of a virtual appliance 1302 may be implemented on one or more of VMs 1308, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1308 may be a software implementation of a physical machine that runs programs as if they were executing on a physical, non-virtualized machine. Each of the VMs 1308, and that part of hardware 1304 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1308 on top of the hardware 1304 and corresponds to the application 1302.

Hardware 1304 may be implemented in a standalone network node with generic or specific components. Hardware 1304 may implement some functions via virtualization. Alternatively, hardware 1304 may be part of a larger cluster of hardware (e.g. such as in a data center or CPE) where many hardware nodes work together and are managed via management and orchestration 1310, which, among others, oversees lifecycle management of applications 1302. In some embodiments, hardware 1304 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1312 which may alternatively be used for communication between hardware nodes and radio units.

Figure 14:
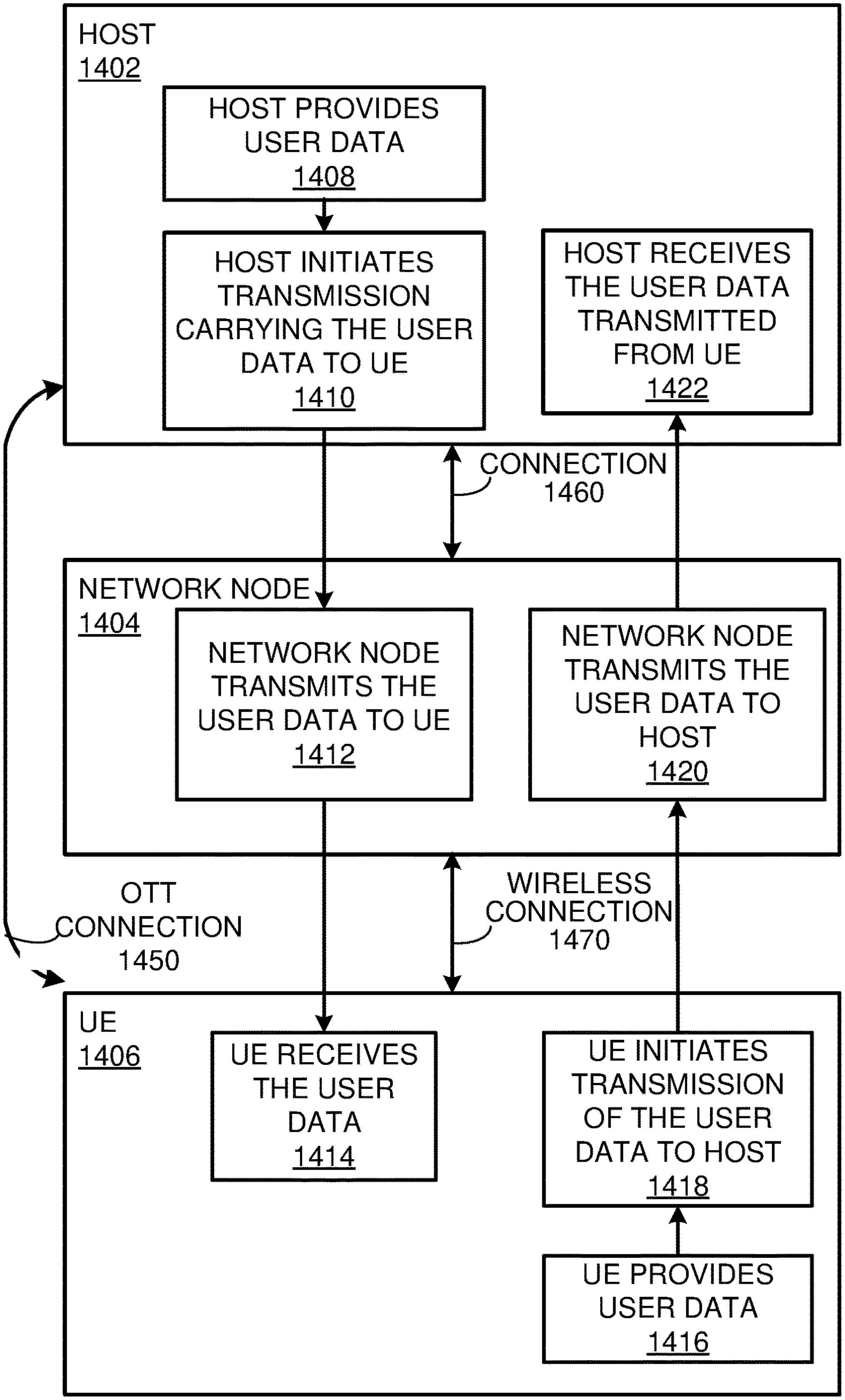
FIG. 14 is a block diagram of a host computer communicating via a base station with a user equipment over a partially wireless connection in accordance with some embodiments in accordance with some embodiments.

FIG. 14 shows a communication diagram of a host 1402 communicating via a network node 1404 with a UE 1406 over a partially wireless connection in accordance with some embodiments. Example implementations, in accordance with various embodiments, of the UE (such as a UE 9012*a* of FIG. 9 and/or UE 1000 of FIG. 10), network node (such as network node 9010*a* of FIG. 9 and/or network node 1100 of FIG. 11), and host (such as host 9016 of FIG. 9 and/or host 1200 of FIG. 12) discussed in the preceding paragraphs will now be described with reference to FIG. 14.

Like host 1200, embodiments of host 1402 include hardware, such as a communication interface, processing circuitry, and memory. The host 1402 also includes software, which is stored in or accessible by the host 1402 and executable by the processing circuitry. The software includes a host application that may be operable to provide a service to a remote user, such as the UE 1406 connecting via an over-the-top (OTT) connection 1450 extending between the UE 1406 and host 1402. In providing the service to the remote user, a host application may provide user data which is transmitted using the OTT connection 1450.

The network node 1404 includes hardware enabling it to communicate with the host 1402 and UE 1406. The connection 1460 may be direct or pass through a core network (like core network 9006 of FIG. 9) and/or one or more other intermediate networks, such as one or more public, private, or hosted networks. For example, an intermediate network may be a backbone network or the Internet.

The UE 1406 includes hardware and software, which is stored in or accessible by UE 1406 and executable by the UE's processing circuitry. The software includes a client application, such as a web browser or operator-specific "app" that may be operable to provide a service to a human or non-human user via UE 1406 with the support of the host 1402. In the host 1402, an executing host application may communicate with the executing client application via the OTT connection 1450 terminating at the UE 1406 and host 1402. In providing the service to the user, the UE's client application may receive request data from the host's host application and provide user data in response to the request data. The OTT connection 1450 may transfer both the request data and the user data. The UE's client application may interact with the user to generate the user data that it provides to the host application through the OTT connection 1450.

The OTT connection 1450 may extend via a connection 1460 between the host 1402 and the network node 1404 and via a wireless connection 1470 between the network node 1404 and the UE 1406 to provide the connection between the host 1402 and the UE 1406. The connection 1460 and wireless connection 1470, over which the OTT connection 1450 may be provided, have been drawn abstractly to illustrate the communication between the host 1402 and the UE 1406 via the network node 1404, without explicit reference to any intermediary devices and the precise routing of messages via these devices.

As an example of transmitting data via the OTT connection 1450, in step 1408, the host 1402 provides user data, which may be performed by executing a host application. In some embodiments, the user data is associated with a particular human user interacting with the UE 1406. In other embodiments, the user data is associated with a UE 1406 that shares data with the host 1402 without explicit human interaction. In step 1410, the host 1402 initiates a transmission carrying the user data towards the UE 1406. The host 1402 may initiate the transmission responsive to a request transmitted by the UE 1406. The request may be caused by human interaction with the UE 1406 or by operation of the client application executing on the UE 1406. The transmission may pass via the network node 1404, in accordance with the teachings of the embodiments described throughout this disclosure. Accordingly, in step 1412, the network node 1404 transmits to the UE 1406 the user data that was carried in the transmission that the host 1402 initiated, in accordance with the teachings of the embodiments described throughout this disclosure. In step 1414, the UE 1406 receives the user data carried in the transmission, which may be performed by a client application executed on the UE 1406 associated with the host application executed by the host 1402.

In some examples, the UE 1406 executes a client application which provides user data to the host 1402. The user data may be provided in reaction or response to the data received from the host 1402. Accordingly, in step 1416, the UE 1406 may provide user data, which may be performed by executing the client application. In providing the user data, the client application may further consider user input received from the user via an input/output interface of the UE 1406. Regardless of the specific manner in which the user data was provided, the UE 1406 initiates, in step 1418, transmission of the user data towards the host 1402 via the network node 1404. In step 1420, in accordance with the teachings of the embodiments described throughout this disclosure, the network node 1404 receives user data from the UE 1406 and initiates transmission of the received user data towards the host 1402. In step 1422, the host 1402 receives the user data carried in the transmission initiated by the UE 1406.

One or more of the various embodiments improve the performance of OTT services provided to the UE 1406 using the OTT connection 1450, in which the wireless connection 1470 forms the last segment. More precisely, the teachings of these embodiments may allow for the use of IP based deterministic networking where there are other IP nodes possible in the system besides the 3GPP network, and thereby provide benefits such as reduced data loss rates, reduced packet delay variation, and bounded latency for real-time applications.

In an example scenario, factory status information may be collected and analyzed by the host 1402. As another example, the host 1402 may process audio and video data which may have been retrieved from a UE for use in creating maps. As another example, the host 1402 may collect and analyze real-time data to assist in controlling vehicle congestion (e.g., controlling traffic lights). As another example, the host 1402 may store surveillance video uploaded by a UE. As another example, the host 1402 may store or control access to media content such as video, audio, VR or AR which it can broadcast, multicast or unicast to UEs. As other examples, the host 1402 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1450 between the host 1402 and UE 1406, in response to variations in the measurement results. The measurement procedure and/or the network functionality for reconfiguring the OTT connection may be implemented in software and hardware of the host 1402 and/or UE 1406. In some embodiments, sensors (not shown) may be deployed in or in association with other devices through which the OTT connection 1450 passes; the sensors may participate in the measurement procedure by supplying values of the monitored quantities exemplified above, or supplying values of other physical quantities from which software may compute or estimate the monitored quantities. The reconfiguring of the OTT connection 1450 may include message format, retransmission settings, preferred routing etc.; the reconfiguring need not directly alter the operation of the network node 1404. Such procedures and functionalities may be known and practiced in the art. In certain embodiments, measurements may involve proprietary UE signaling that facilitates measurements of throughput, propagation times, latency and the like, by the host 1402. The measurements may be implemented in that software causes messages to be transmitted, in particular empty or 'dummy' messages, using the OTT connection 1450 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

The routing of the communications network refers to any one of the routing configuration of the communications network, the routing policies of the communications network, the routing rules of the communications network, and generally to any routing information of the routing applied in the communications network.

The invention claimed is:

1. A method performed by a network node of a communications network for enabling internet protocol, IP, based deterministic networking, comprising:

receiving a configuration request from a deterministic network, DetNet, controller;

determining whether the configuration request conflicts with the routing of the communications network; and responsive to determining whether the configuration request conflicts with the routing of the communications network, transmitting a response to the DetNet controller indicating acceptance or denial of the configuration request.

2. The method of claim 1, wherein the communications network comprises a 5th generation, 5G, network, wherein the network node is a DetNet application function, and wherein the network node comprises a core network, CN, node configured to provide the DetNet application function.

3. The method of claim 1, further comprising:

determining control and configuration information of the communications network, the control and configuration information including information about the routing of the communications network;

particularly wherein determining control and configuration information comprises receiving control and configuration information from at least one of a user plane function, UPF; a session management function, SMF, an access and mobility management function, AMF; and a policy control function, PCF.

4. The method of claim 1, wherein the control and configuration information comprises routing information including IP addresses assigned over packet data unit, PDU, sessions in the communications network.

5. The method of claim 1, wherein determining the control and configuration information of the communications network comprises determining multicast delivery rules associated with the communications network including at least one of information associated with supported multicast addresses; flows for which multicast delivery is configured; and a set of outgoing interfaces.

6. The method of claim 5, wherein determining whether the configuration request conflicts with the routing of the communications network comprises determining whether the configuration request complies with the multicast delivery rules.

7. The method of claim 1, wherein determining whether the configuration request conflicts with the routing of the communications network comprises determining whether an IP address of a DetNet flow compares to an IP address of a PDU session.

8. The method of claim 1, wherein determining whether the configuration request conflicts with the routing of the communications network comprises determining that the configuration request is in conflict with the routing of the communications network, and wherein transmitting the response to the DetNet controller comprises transmitting a denial of the configuration request.

9. The method of claim 1, wherein determining whether the configuration request conflicts with the routing of the communications network comprises determining that the configuration request does not conflict with the routing of the communications network, and wherein transmitting the response to the DetNet controller comprises transmitting an acceptance of the configuration request.

10. The method of claim 1, wherein determining whether the configuration request conflicts with the routing of the communications network comprises determining that the configuration request is in conflict with the routing of the communications network, the method further comprising:

updating the routing of the communication network to avoid the configuration request from conflicting with the routing of the communication network, wherein transmitting the response to the DetNet controller comprises, responsive to updating the routing of the communication network, transmitting an acceptance of the configuration request.

11. The method of claim 10, wherein updating the routing of the communication network comprises:

converting configuration information associated with the configuration request to configuration information applicable to the communications network; and transmitting the configuration information applicable to the communications network to at least one of a user plane function, UPF; a session management function, SMF, an access and mobility management function, AMF; and a policy control function, PCF of the communications network.

12. The method of claim 9, further comprising:

receiving a request to establish a DetNet flow associated with the configuration request in the communications network from the DetNet controller, the request to establish the DetNet flow including quality of service, QoS, requirements for the DetNet flow;

determining whether the communications network is capable of meeting the QoS requirements; and responsive to determining that the communication network is capable of meeting the QoS requirements, establishing the DetNet flow.

13. The method of claim 12, wherein determining whether the communications network is capable of meeting the QoS requirements comprises:

converting the QoS requirements for the DetNet flow to 3rd generation partnership project, 3GPP, specific QoS requirements; and transmitting the 3GPP specific QoS requirements to a policy control function, PCF of the communications network.

14. The method of claim 1, further comprising:

receiving a request to establish a deterministic network, DetNet, flow in the communications network from a DetNet controller or a software-defined network, SDN, controller, the request to establish the DetNet flow including quality of service, QoS, requirements for the DetNet flow;

determining whether the communications network is capable of meeting the QoS requirements; and responsive to determining that the communication network is capable of meeting the QoS requirements, establishing the DetNet flow.

15. A network node of a communications network for enabling internet protocol, IP, based deterministic networking, the network node comprising a processor and a memory, the memory containing instructions executable by the processor such that the network node is operable to perform the method of claim 1.

16. A computer program product comprising a non-transitory storage medium including program code to be executed by processing circuitry of a network node, whereby execution of the program code causes the network node to perform operations comprising any operations of claim 1.

17. A non-transitory computer-readable medium having instructions stored therein that are executable by processing circuitry of a network node in a communications network for enabling internet protocol, IP, based deterministic networking, to cause the network node to perform operations comprising any of the operations of claim 1.

* * * * *